Aug. 25, 1936.  J. ECKLEY  2,051,988
LAWN EDGER
Filed July 6, 1935  2 Sheets-Sheet 1

Inventor
Junior Eckley
By Cline Hartson
Attorney

Aug. 25, 1936. J. ECKLEY 2,051,988
LAWN EDGER
Filed July 6, 1935 2 Sheets-Sheet 2
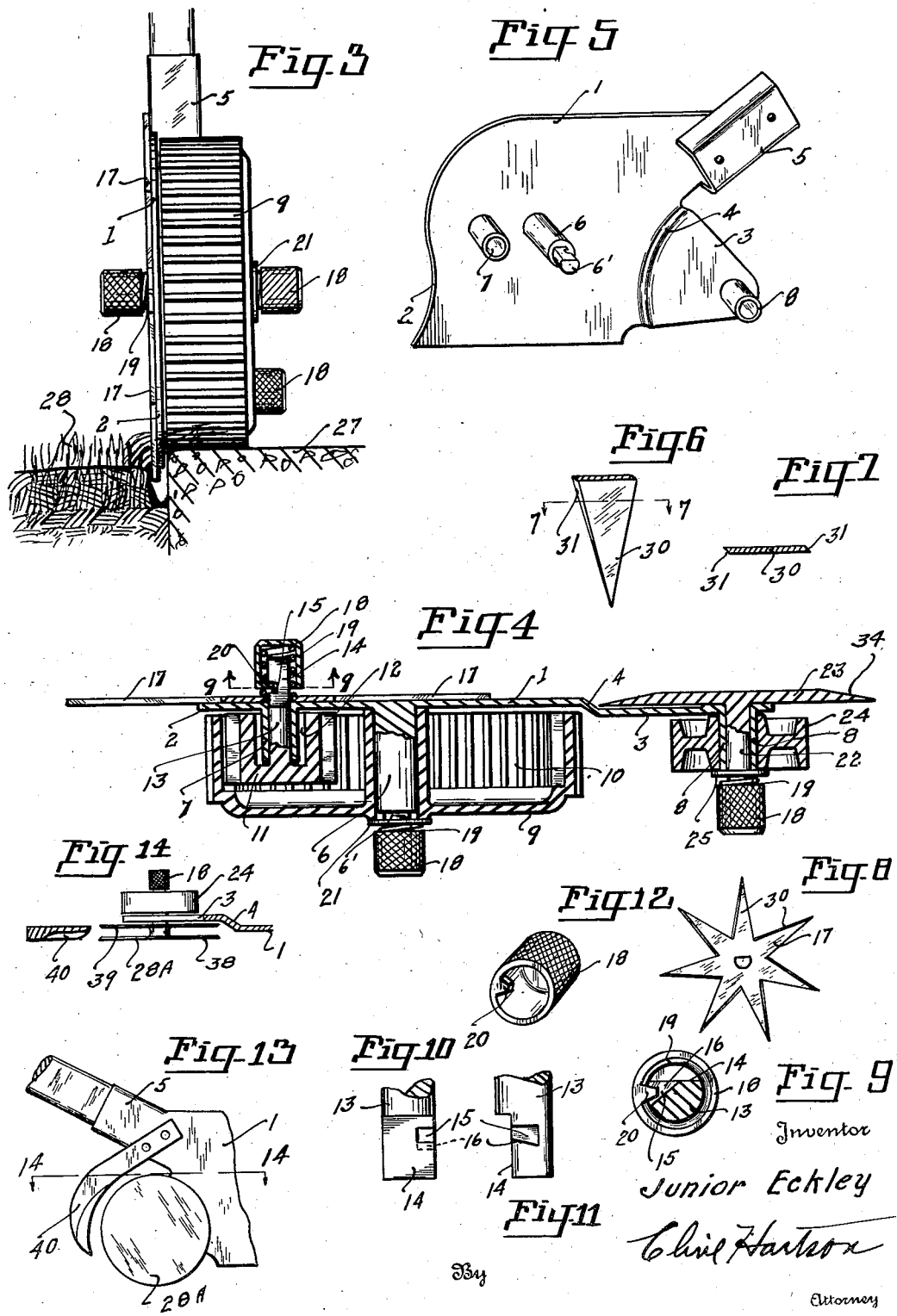
Inventor
Junior Eckley Patented Aug. 25, 1936

2,051,988

UNITED STATES PATENT OFFICE 2,051,988

LAWN EDGER

Junior Eckley, Salem, Oreg.

Application July 6, 1935, Serial No. 30,080

6 Claims. (Cl. 97—227)

One object of the invention is to provide improvements in cutter heads or grass blades for lawn edges. The improvement in this instance consists in making such blade star shaped and arranging its cutting edges so that it may be reversed upon its mounting thus practically doubling the length of time the blade may be employed before it becomes necessary to sharpen the same.

Another object of the invention is to provide a cutting wheel that is slidably mounted on its driving shaft and is automatically tensioned against the stationary cutting blade by a spring so that in the event that any foreign particle lodges between the cutting wheel and the stationary blade it can be removed easily without injuring the cutting edges, the tension of the spring being sufficient to keep the tension of the cutter blade in predetermined adjustment.

Another object of the invention is to provide improvements in the main frame construction, such improvements in this instance residing in simplifying the means for mounting the operating parts thereto and the elimination of parts heretofore thought necessary.

Another object of the invention is to provide simplification in the means for securing the operating parts to the main frame. In this connection there is provided new and novel securing members or nuts which in combination with other elements permit the operating parts to be operatively secured to the frame with a minimum of effort and time expenditure.

A further object of the invention is to employ a minimum of operating parts and to make these as simple as possible in order to reduce cost in manufacture, to reduce time in assembly and maintenance, and to increase ease in operation of the invention.

An additional object of the invention is to provide an edger of this type with an improved turf cutting and removing means whereby turf immediate to walks, walls and the like may be removed.

These and other objects of the invention will be readily perceived upon reading the description thereof following, aided by the several views thereof in the accompanying drawings, wherein Figure 1 is a side elevation of the invention showing the cutter head or grass blade.

Figure 3 is an end elevation taken from a point in front of the device.

Figure 4 is the sectional view indicated by the section line 4—4 in Figure 2. This figure illustrates the new and novel means employed for mounting the operating parts of the device.

Figure 5 is a side elevation, partially perspective, of the main frame with the operating parts removed.

Figure 6 is a side elevation of one of the cutter leaves of the cutter head or grass wheel.

Figure 7 is the section of the cutter leaf indicated by section line 7—7 in the preceding figure.

Figure 8 is a side elevation of the cutter head or grass wheel.

Figure 9 is the section indicated by section line 9—9 in Figure 4. This view and the indicated portions in Figure 4 disclose the improved locking means for securing the operative parts to the frame.

Figures 10 and 11 are plans of spindles employed in connection with the operative parts and the locking means and disclose further the improved means for instantaneously securing the operative parts in co-operative association.

Figure 12 is a perspective of one of the locking members or nuts employed in connection with the spindles shown in the two preceding views.

Figures 13 and 14 are respectively a partial side elevation and a partial horizontal section of the rear section of the device showing the improved turf cutting and removing means.

Figure 1:
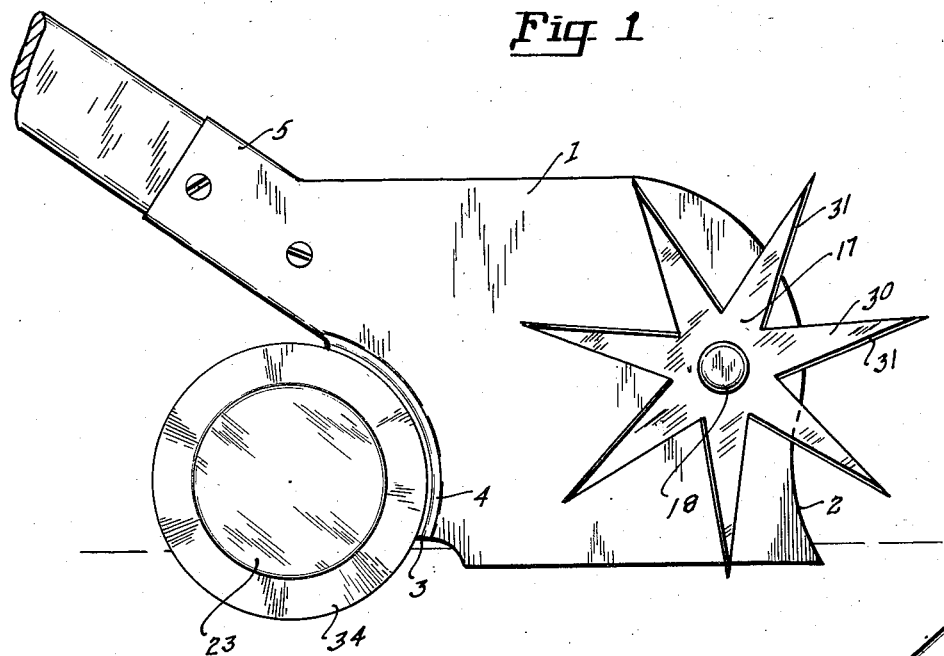
Figure 2:
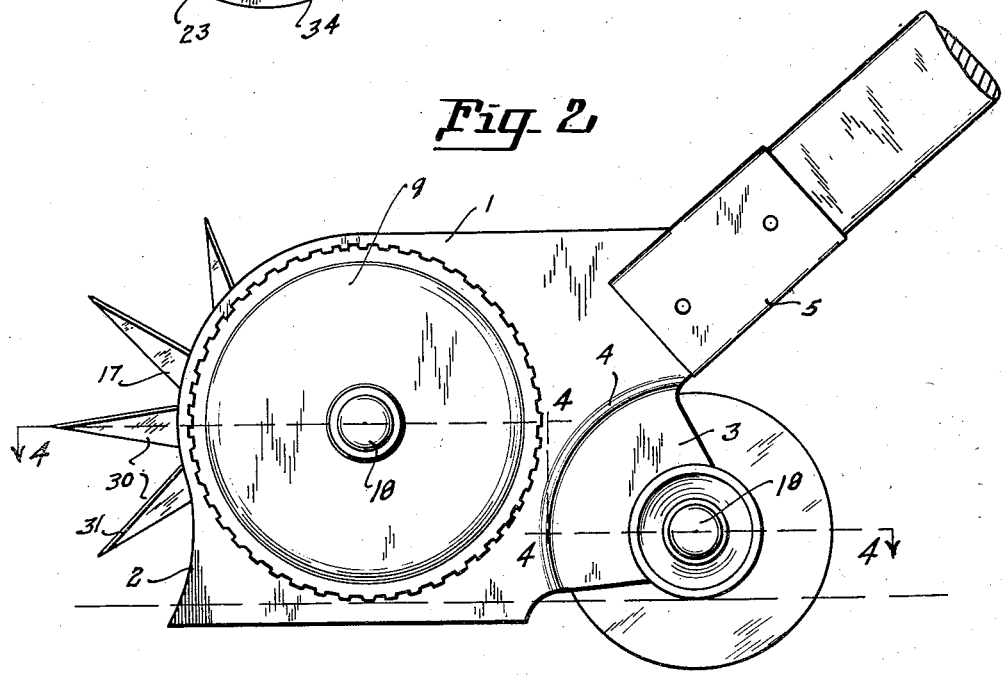
Figure 2 is a side elevation, reverse to the preceding figure, showing the side upon which the operating parts are mounted.

In the drawings the invention is seen to employ an essential frame 1 having upper and lower parallel edges. The front end is reversely curved to provide an arcuately concave lower portion 2 constituting a stationary cutter knife in conjunction with the cutter head hereafter described. The rear end of the frame has a projecting portion 3 defined by the offset 4. In addition thereto the rear end of the frame is provided with a handle socket 5.

Projecting from one side of the frame 1, which side for convenience may be termed the inner side, and the opposite side the outer side, is a spindle 6 the outer end of which is reduced at 6'. In addition to the spindle 6 two journaling sleeves 7 and 8 project from the inner side of the frame. The sleeve 7 is positioned forwardly of spindle 6, and the sleeve 8 from the end portion 3 as shown in Figure 5. Mounted upon spindle 6 is a ground wheel 9 having an inside gear face 10.

Interiorly of the wheel 9 is a gear 11 the teeth of which mesh with the teeth of the gear face 10. This gear is provided with a socket 12 fitting freely about the sleeve 7. Spindle 13 projects from the bottom of the socket and is journaled in the sleeve 7 and projects somewhat from the outer side of the frame. The outer end has a flattened face 14 into which opens a notch 15 having an outer inclined wall 16.

To the projecting end of the spindle 13 is mounted the star wheel cutting head 17 which is held in place by the nut 18 and spring 19. The spring 19 is coiled within the nut 18 by being threaded past the lug 20 in such a manner as to be rigidly fixed therein, the spring fitting loosely over the shaft or spindle 13. The cap 18 has an interiorly projecting lug 20 at its open end. This lug, as the cap is mounted in place, rides upon the flattened face 14 of the spindle until it reaches the vicinity of the notch 15 whereupon the cap is turned upon the spindle until the lug reaches and seats in such notch; thereafter the expansive urge of spring 19 will maintain the lug in engagement with the inclined wall 16 of notch 15 preventing the cap from turning relative to the spindle 13 at the same time maintaining the star wheel or cutter head 17 and the gear 11 in operative position.

From the foregoing it will be readily seen that the cap and nut 18 may be readily removed from the spindle 13. Pressing the cap inwardly against the pressure of the spring 19 and turning until the lug engages the flat face 14, removing the cap and spring 19, whereupon the gear 11 may be removed insofar as it is not prohibited by the wheel 9.

The reduced end 6' of spindle 6 is likewise provided with a flat face 14, notch 15 with inclined side wall to receive a cap 18, spring 19 for securing the wheel 10 in position. In this instance the wheel spring bears upon a washer 21. This provides for the ready removal of the wheel.

Figure 8A:
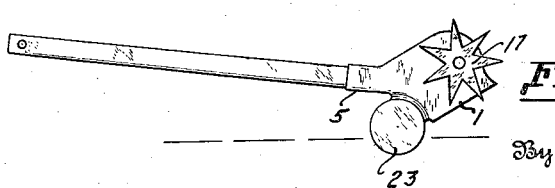
Figure 8A is a side elevation of the assembled device illustrating the same being used for cutting trench prior to the edging of the lawn by the cutting blade.

Mounted interiorly of the sleeve 8 is the spindle 22 of the edging knife or turf disk 23, while exteriorly to the sleeve is a ground roller or wheel 24, both of which are maintained in their mounted position by a cap 18 and spring 19, the spring bearing upon the washer 25, and the end of the spindle being prepared to receive the cap as previously described for spindle 13. The turf disk 23 is somewhat thicker than the width of the stationary cutting blade and the rotary cutter and is used as illustrated in Figure 8A, providing a trench for receiving the cutter blades of the edger as illustrated in Figure 3.

The present device is employed for trimming lawns along their edges. Figure 3 illustrates the device being employed for edging a lawn where it borders a walk. In this instance the edger is disposed so that the wheel 9 travels on the edge of the walk 27 in order to trim the border of the lawn 28, the lower edge of the frame extending below the top of the walk. The wheel 24 stabilizes the position of the edger so that the right depth will be maintained for the cutter blade. The trench cutting disk 23 follows the trench previously cut which further assists in the stabilizing of the edger and is quite important. As the device is propelled the cutter rotates by reason of the rotation of the wheel 10 which is trained to the cutter. The wheel 17 is provided with a number of leaves 30 having beveled edges 31. These edges are correspondingly beveled on both sides of the leaves in order that the wheel may be reversed to extend the period of use between grinding or sharpening. The edges 31 move past the arcuate edging 2 which is the stationary cutting edge; the grass is cut between the two as shown.

The turf or sod disk 23 is provided with a beveled edge 34 which cuts the roots of growing vegetation close to the walk, grass stalks, and cuts into and edges the sod. Where it is desired to remove part, or a strip of the sod, a double disk 38 employing or consisting of two spaced blades 39 is employed instead of disk 23. These disks cut two parallel cleavages in the sod. The sod between cleavages is removed by means of the shovel 40 attached rearwardly of the disks and to the frame 1.

As will be noted the offset 4 places the cutting edge of the disk 23 in line with the outer face of the frame so that such disk can cut closely to the walk 27.

While a specific form of the improvement has been described and illustrated herein, it is desired to be understood that the same may be varied, within the scope of the appended claims, without departing from the spirit of the invention.

Having described my invention, I claim—

1. In a lawn edger, a frame having a spindle and a pair of sleeves projecting from its inner side, a gear having a spindle mounted through one of said sleeves, a star cutter wheel mounted on the latter spindle on the outside of the frame, a wheel having inner teeth meshing with the gear teeth mounted upon the first spindle, a cutting disk having a spindle extending through the other sleeve, a roller mounted about the last sleeve, said spindles each having a flat face upon their outer ends provided with a notch, a spring about the end of the spindle, a cap covering and compressing the spring, and a lug projecting inside the cap entering the notch and holding the cap in place.

2. In a lawn edger, a frame, having a forward concave cutter edge, a star wheel cutter wheel mounted on the frame with its face juxtapositioned to the face of the frame, and a ground wheel connected to rotate the star wheel, said star wheel having a number of cutting leaves and each leaf having two cutting edges correspondingly beveled in order that such wheel can be reversed with regard to the frame.

3. In a lawn edger, a frame, a cutter head and a ground wheel operatively mounted thereon, the ground wheel operating the cutter head, an offset in the frame, a sleeve in the offset portion, a beveled cutter disk mounted to the offset portion by means of a spindle riding in the sleeve, a roller mounted about the sleeve, the spindle having a flat face at one end provided with a notch, a cap fitting over such end, a spring between roller and cap, and a lug interiorly of the cap seating in such notch.

4. In a lawn edger, a frame, a cutter head and a ground wheel operatively mounted thereon, the ground wheel operating the cutter head, a roller mounted rearwardly of the wheel, a disk mounted rearward of the cutter head, said disk cutting cleavages in the soil, and a shovel rearwardly of the disks for lifting soil cut by the disk.

5. In a lawn edger, a frame having an arcuate cutter edge along its forward end, a sleeve projecting from one side of the frame, a gear provided with a spindle which is journaled in the sleeve and projects from the other side of the frame, a cutter wheel mounted on the projecting end of the spindle cooperating with the cutter edge, and a ground wheel journaled on the frame and provided with an internal gear which meshes with and drives the first mentioned gear.

6. In a lawn edger, a frame having its forward end arcuately formed to provide a cutter edge, a sleeve projecting from one side of the frame, a gear provided with a spindle which is journaled in the sleeve and which spindle projects from the other side of the frame, a reversible cutter wheel mounted upon the projecting end of the spindle cooperating with the cutter edge, and a ground wheel geared to and operating said gear.

JUNIOR ECKLEY.